(12) United States Patent
Drexhage et al.

(10) Patent No.: US 6,737,280 B1
(45) Date of Patent: May 18, 2004

(54) AMIDOPYRYLIUM FLUORESCENCE DYES

(75) Inventors: Karl-Heinz Drexhage, Siegen (DE); Jutta Arden-Jacob, Zirndorf (DE); Norbert Kemnitzer, Netphen (DE)

(73) Assignee: Karl-Heinz Drexhage, Siegen (DE)

( * ) Notice: Subject to any disclaimer, the term of this patent is extended or adjusted under 35 U.S.C. 154(b) by 0 days.

(21) Appl. No.: 09/980,538

(22) PCT Filed: Apr. 19, 2000

(86) PCT No.: PCT/EP00/03569
§ 371 (c)(1),
(2), (4) Date: Nov. 26, 2001

(87) PCT Pub. No.: WO00/64987
PCT Pub. Date: Nov. 2, 2000

(30) Foreign Application Priority Data

Apr. 27, 1999 (DE) .......................... 199 19 120

(51) Int. Cl.$^7$ ...................... G01N 33/533; C07K 17/02; C07D 471/02; C07D 491/12; C07D 471/22
(52) U.S. Cl. ...................... 436/546; 436/528; 436/529; 436/530; 436/531; 436/800; 530/391.3; 530/402; 546/37; 546/41; 546/48; 546/70
(58) Field of Search ............................. 546/70, 48, 37, 546/41; 436/528, 546, 529, 530, 531, 800; 530/391.3, 402

(56) References Cited

U.S. PATENT DOCUMENTS 3,786,369 A * 1/1974 Drexhage et al.

FOREIGN PATENT DOCUMENTS

| EP | 0 543 333 A | 5/1993 |
| WO | WO 97/36960 A | 10/1997 |

OTHER PUBLICATIONS

R. Sairam, Indian Journal of Chemistry, vol. 18A, 106–108 (1979).*
H. Harnisch et al, Liebigs Ann. Chem., vol. 740, 164–168 (1970).*
J. Arden–Jacob et al, Spectrochimica Acta, Part A: Molecular and Biomolecular Spectroscopy, vol. 57A(11), 2271–2283 (2001.*
H. Harnisch: "Über 4–Chlor–7–dimethylamino–1–methyl–chinolon–(2)–aldehyd–(3), II" Liebigs Annalen der Chemie, vol. 751, 1971, pp. 155–158, XP002145601 Verlag Chemie GmbH. Weinheim.
F.P. Schäfer: "Topics in Applied Physics, vol. I, Dye Lasers", 1973, Springer–Verlag, Berlin, XP002145602 006001, K.H. Drexhage, Structure and Properties of Laser Dyes, p. 176.

* cited by examiner

Primary Examiner—Mary E. Ceperley
(74) Attorney, Agent, or Firm—Henry M. Feiereisen; Ursula B. Day

(57) ABSTRACT

A class of asymmetric monobenzoxanthene compounds useful as fluorescent dyes are disclosed having structure (I) wherein $Y_1$ and $Y_2$ are individually hydroxyl, amino, imminium, or oxygen, $R_1$–$R_8$ are hydrogen, fluorine, chlorine, alkyl, alkene, alkyne, sulfonate, amino, amido, nitrile, alkoxy, linking group, and combinatios thereof, and $R_9$ is acetylene, alkane, alkene, cyano, substituted phenyl, and combinations thereof. The invention further includes novel intermediate compounds useful for the synthesis of asymmetric benzoxanthene compounds having general structure (II) where substituents $R_3$–$R_7$ correspond to like-referenced substituents in the structure of described above, and $Y_2$ is hydroxyl or amine. In another aspect, the invention includes methods for synthesizing the above dye compounds and intermediates. In yet another aspect, the present invention includes reagents labeled with the asymmetric benzoxanthene dye compounds, including deoxynucleotides, dideoxynucleotides, phosphoramidites, and polynucleotides. In an additional aspect, the invention includes methods utilizing such dye compounds and reagents including dideoxy polynucleotide sequencing and fragment analysis methods.

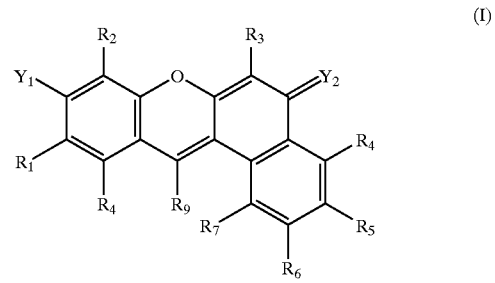

(I)

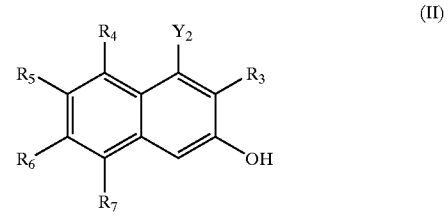

(II)

18 Claims, 3 Drawing Sheets

Absorption and fluorescence spectra in ethanol
Figure 1: JA 227
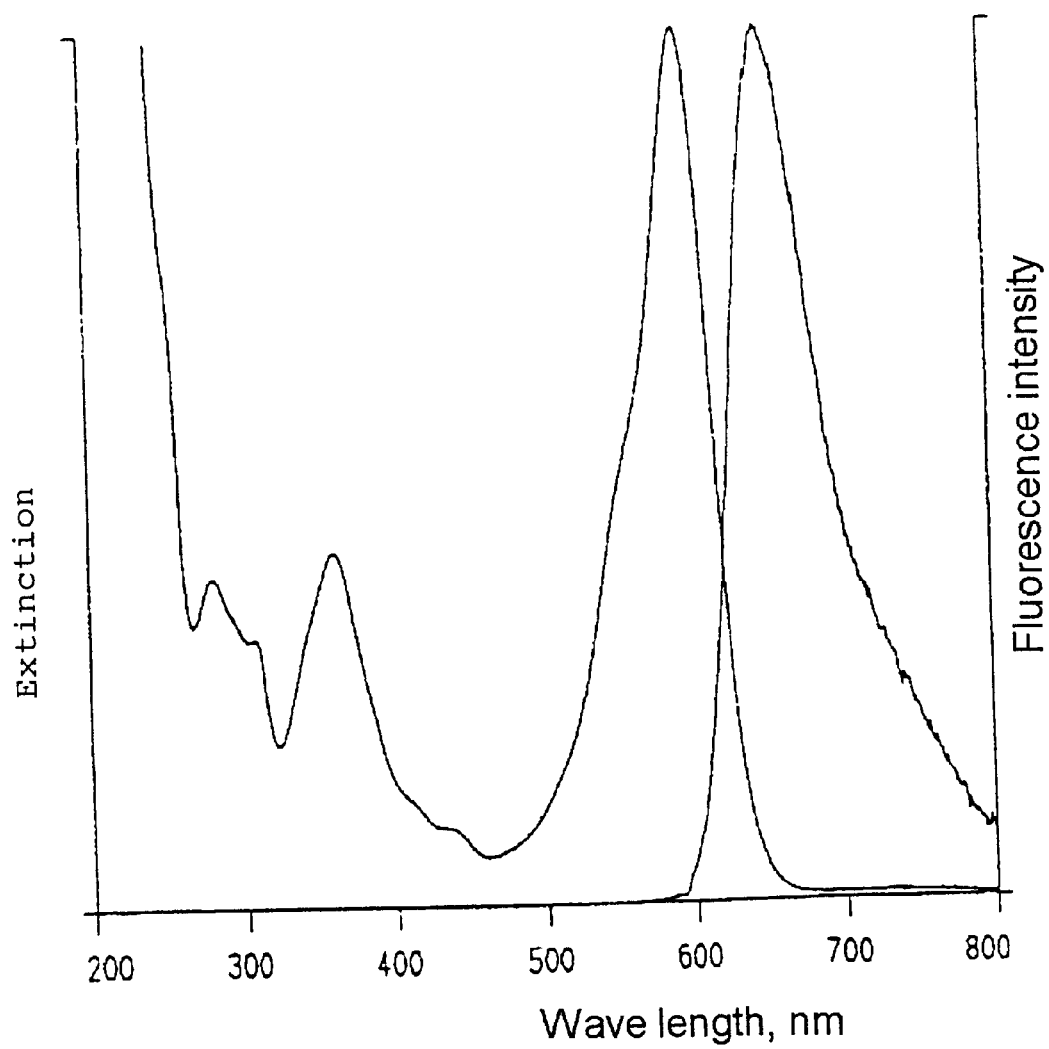

Figure 2: NK 13
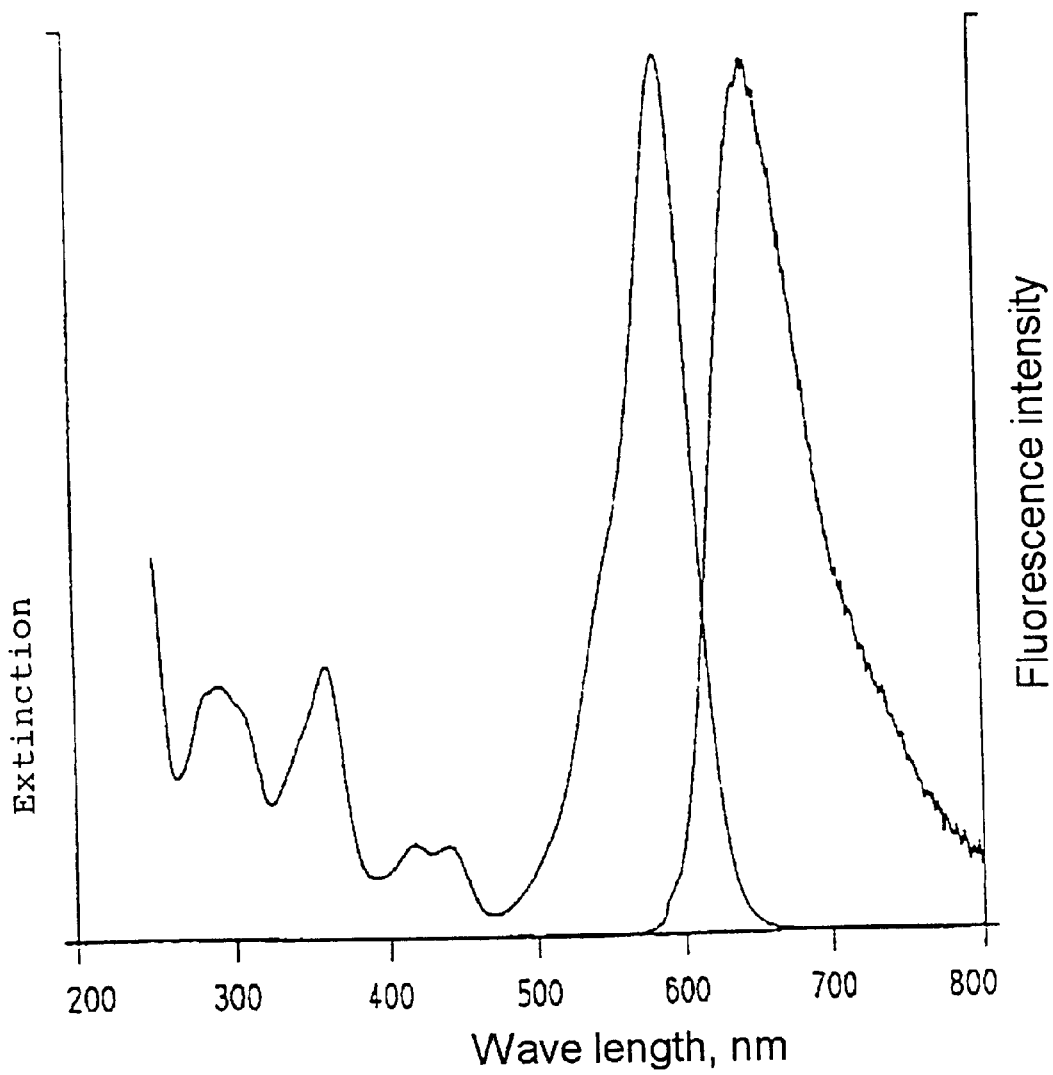

Figure 3: NK 14
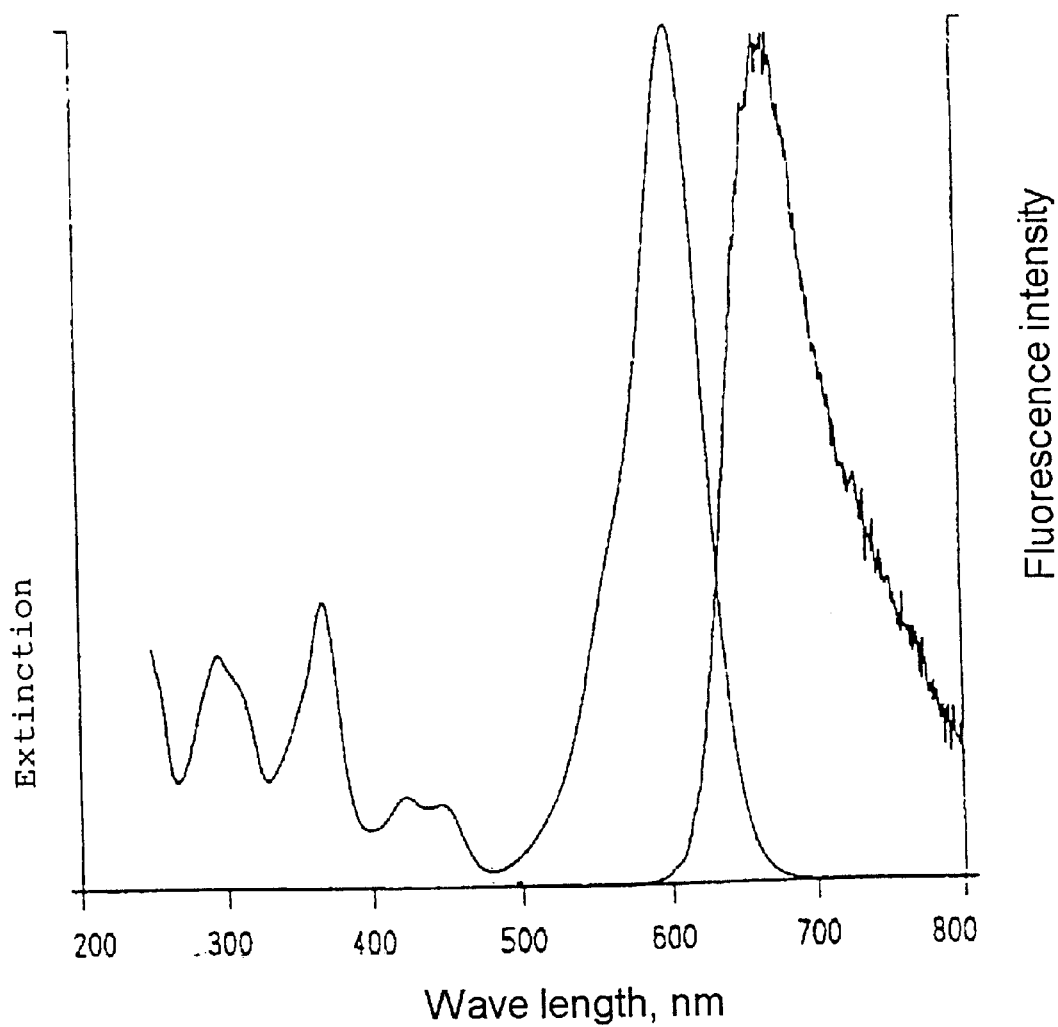

AMIDOPYRYLIUM FLUORESCENCE DYES

BACKGROUND OF THE INVENTION

The invention relates to the use of amidopyrylium compounds as labeling groups in procedures for the detection of analytes, and to novel amidopyrylium compounds.

Xanthenes are long-known and well-researched fluorescent dyes. A related dye having a modified parent structure, the 3,10-bis(dimethylamino)-5-methyl-6-oxo-6H[1]-benzopyrano[3,2-c]quinolinium cation, has been described by H. Harnisch, Liebigs Ann. Chem. 751, 155–158 (1971).

On account of their similarity to pyrans, compounds of this type were also designated as amidopyrylium compounds by K. H. Drexhage, Structure and Properties of Laser Dyes, in: F. P. Schäfer, Topics in Applied Physics, Vol. I, Dye Lasers, Springer-Verlag, Berlin, Heidelberg, N.Y., 1973. In this publication, amidopyrylium compounds are further designated as dye 140 and 141. Information on the use of amidopyrylium compounds as fluorescent labeling groups in analysis is not found in the literature.

Fluorescent dyes used hitherto in chemical, medical and biological analysis mostly absorb in the range <600 nm. Serious disadvantages result therefrom when using them as a labeling group, in particular in biological systems: For diagnostic systems, it is expedient to be able to employ inexpensive light sources such as, for example, laser diodes (635 or 680 nm) or helium-neon lasers (633 nm). In order to guarantee an effective excitation of a fluorescent dye, its absorption maximum should if possible be in the vicinity of the emission wavelength of the light source used. However, this is often not conferred in the case of the known dyes. Furthermore, in many cases the absorption spectra of the known dyes overlap with the absorption of fluorescent substances from biological systems. It is therefore desirable to make available fluorescent dyes without the disadvantages mentioned for a reliable and precise detection of an analyte in a biological system.

For use as a labeling group in detection procedures for analytes, in addition to a simple and reliable detectability, a good solubility in various solvents, in particular in aqueous systems, is necessary. Furthermore, compounds of this type should be simple and inexpensive to prepare and have a good durability, i.e. shelf life.

SUMMARY OF THE INVENTION

An object of the present invention was thus to make available suitable fluorescent dyes which can be employed as labeling groups for procedures for the detection of analytes, which in particular have absorption maxima which allow the use of inexpensive light sources, absorb outside the absorption range of substances contained in biological samples, exhibit good solubility or/and are distinguished by a high fluorescence quantum yield, in order at least partially to avoid the disadvantages of the prior art.

This object has been achieved by the use of compounds of the general formula I

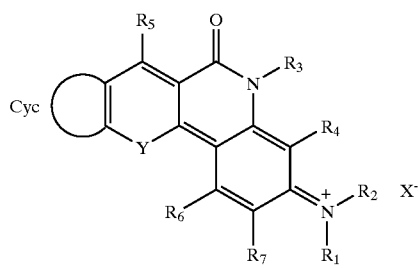

as labeling groups in a procedure for the detection of an analyte, where

Y is oxygen or N—$R_8$, $R_1$, $R_2$, $R_3$ and $R_8$, on each occurrence, are independently hydrogen, a phenyl group, a phenylalkyl group having 1–3 C atoms in the alkyl chain, a polyether group or a hydrocarbon group having up to 20 C atoms, preferably having up to 6 C atoms, which can optionally contain one or more substituents, preferably selected from halogens, hydroxyl, amino, sulfo, carboxyl, carbonyl, alkoxy or/and alkoxycarbonyl groups, or one or more of the radicals $R_1$, $R_2$, $R_3$ and $R_8$ form a ring system with an adjacent substituent, $R_4$, $R_5$, $R_6$ and $R_7$ in each case independently of one another are hydrogen, halogen, phenyl, a hydroxyl, amino, sulfo or carboxyl group or a hydrocarbon group having up to 15 C atoms, where the hydrocarbon groups can comprise alkyl, alkenyl, alkynyl, cycloalkyl, aryl or/and heteroaryl radicals and can optionally in each case contain one or more substituents, preferably selected from halogens, hydroxyl, amino, sulfo, carboxyl, aldehyde, alkoxy or/and alkoxycarbonyl groups, where one or more of the radicals $R_4$, $R_6$ and $R_7$ can form a ring system with an adjacent substituent, Cyc is an organic radical which comprises a ring system selected from aromatic, heteroaromatic, quinoid or/and cycloaliphatic rings, which can optionally contain one or more substituents, preferably selected from halogens, amino, hydroxyl, sulfo, carboxyl, aldehyde, alkoxy or/and alkoxycarbonyl groups, and X is optionally anions present for charge equalization.

The compounds of the general formula I can be employed as labeling groups in procedures for the qualitative or/and quantitative determination of an analyte. The determination can be carried out in aqueous liquids, e.g. samples of body fluids such as, for example, blood, serum, plasma or urine, waste water samples or foodstuffs. The procedure can also be carried out as a wet test, e.g. in a cuvette, or as a dry test in an appropriate reagent carrier. The determination of the analytes can be carried out here by means of a single reaction or by means of a sequence of reactions.

Surprisingly, the use of compounds of the general formula I showed very good results in chemical and in particular in medical and biological detection procedures for the determination of an analyte.

The compounds of the general formula I can be used in all known chemical, medical and biological detection procedures in which fluorescent dyes are suitable as labeling groups. Procedures of this type are known to the person skilled in the art and therefore do not have to be elaborated further.

In a particularly preferred embodiment, the compound of the general formula I is coupled covalently to a receptor specific for the analyte to be detected. The specific receptor is any suitable compound or any suitable molecule, preferably it is a peptide, polypeptide or a nucleic acid. The compounds I or conjugates of this compound can be used, for example, in nucleic acid hybridization procedures or immunochemical procedures. Procedures of this type are described, for example, in Sambrook et al., Molecular Cloning, A Laboratory Manual, 1989, Cold Spring Harbor.

A further object of the present invention was to make available novel amidopyrylium compounds which are suitable in particular for use as labeling groups in procedures for the detection of analytes and at least partially avoid the disadvantages of the prior art.

This object has been achieved by a compound of the general formula I

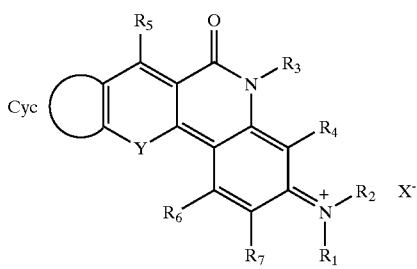

where
Y, $R_1$–$R_7$ and Cyc have the meanings indicated in claim 1, X is optionally anions present for charge equalization, with the proviso that if Y is oxygen, $R_1$, $R_2$ and $R_3$ are methyl and $R_4$, $R_5$, $R_6$ and $R_7$ are hydrogen,
Cyc does not have a structure of the formulae II or III

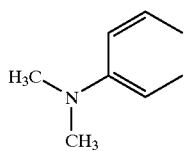

II

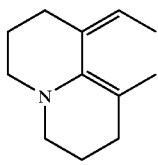

III

An advantage of the compounds I is that owing to an almost arbitrary substituent variation the properties of individual compounds, e.g. the spectroscopic properties, the position of the absorption maxima, the solubility properties, the fluorescence decay time and the magnitude of the quantum yield, varies strongly and thus can be selected as desired. In this way, interferences with interfering substances in samples, such as, for example, serum, blood or plasma etc. can be reduced or even avoided completely. The preparation of the compounds I can be carried out by methods known per se in a simple and inexpensive manner, as is explained in the following examples. Furthermore, the compounds can be handled unproblematically. The further advantage of the compounds I is the large Stokes shift of the fluorescence, by means of which a good separation of the excitation radiation is facilitated. The compounds are furthermore distinguished by a high stability, which in particular has a positive effect on their storability.

Preferably, Y is oxygen or/and $R_5$ comprises an aromatic, optionally substituted ring system.

The compounds preferably have a group capable of covalent coupling, e.g. —COOH, —$NH_2$, —OH or/and —SH. By means of this coupling group, the compound can be coupled to a carrier or/and to a biomolecule by methods known per se. The carrier selected can be any suitable material, e.g. porous glass, plastics, ion-exchange resins, dextrans, cellulose, cellulose derivatives or/and hydrophilic polymers. The biomolecules are preferably selected from peptides, polypeptides, nucleotides, nucleosides, nucleic acids, nucleic acid analogs or/and haptens.

Surprisingly, the absorption maximum and the fluorescence quantum yield are not significantly changed by coupling of the compounds according to the invention to the abovementioned carriers and biomolecules.

In a preferred class of compounds, $R_1$ is bridged with $R_7$ or/and $R_2$ with $R_4$ and form a ring system, in particular having 5- or 6-membered rings. In a particularly preferred class of compounds, Cyc in formula I has a structure of the formulae IV, V or VI

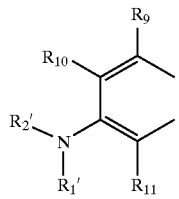

IV

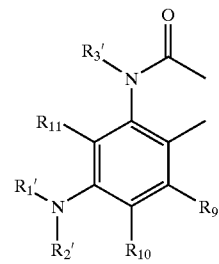

V

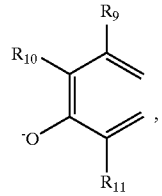

VI where $R_1'$, $R_2'$ and $R_3'$ are defined as $R_1$, $R_2$ and $R_3$ above and $R_9$–$R_{11}$ are defined as $R_4$–$R_7$ above.

In a further preferred class of compounds, $R_1'$ is bridged with $R_{11}$ or/and $R_2'$ with $R_{10}$ and form a ring system, in particular a 5- or 6-membered ring.

Examples of particularly preferred classes of compounds are shown in the general formulae VIIa to f:

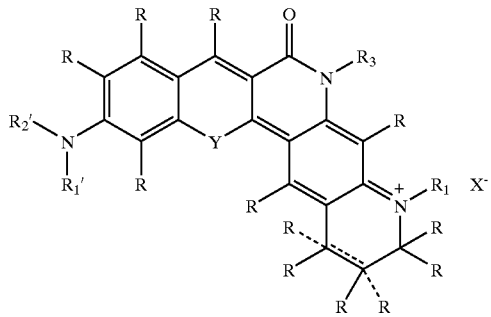

VIIa

-continued

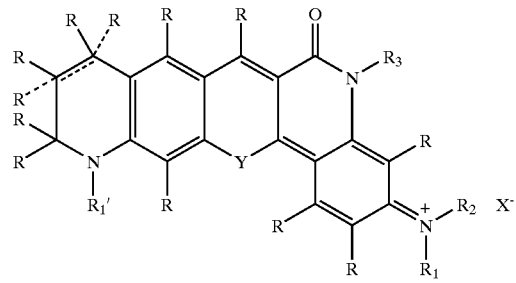
VIIb

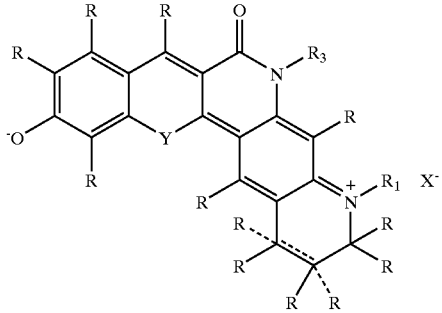
VIIe

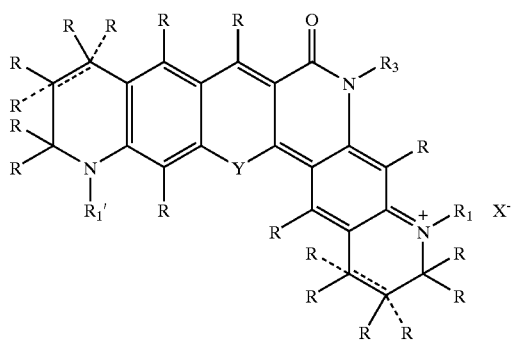
VIIc

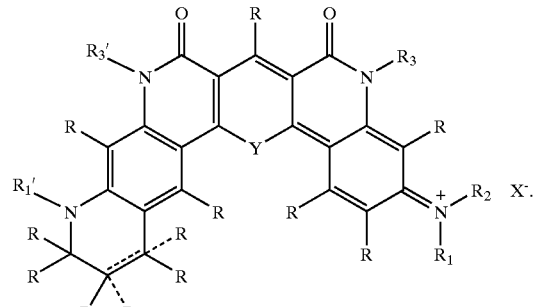
VIIf

VIId where the dashed lines are optionally double bonds, in whose presence the radicals R bonded via a dashed line are absent, X, Y, $R_1$, $R_2$, $R_3$, $R_1'$, $R_2'$ and $R_3'$ are as defined above, and R is in each case independently defined as $R_4$ above.

Actual examples of compounds according to the invention are shown in table 1 below.

TABLE 1

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 1 NK 9 | 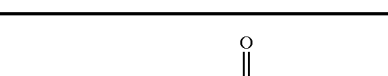 | 595 | 650 | 21 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 2 NK 1 | | 609 | 668 | 11 |
| 3 NK 8 | | 595 | 650 | 34 |
| 4 NK 5 | | 609 | 663 | 19 |
| 5 JA 227 | | 596 | 651 | 31 |
| 6 Dye 141 | | 602 | 646 | 47 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 7 JA 230 | | 613 | 665 | 31 |
| 8 JA 226 | | 613 | 664 | 37 |
| 9 JA 228 | | 628 | 675 | 24 |
| 10 NK 6 | | 628 | 680 | 21 |
| 11 NK 4 | | 522 | 605 | 21 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 12 NK 7 | | 587 | 650 | 15 |
| 13 Dye 140 | | 664 | 715 | 2 |
| 14 NK 2 | | 666 | 720 | 1 |
| 15 JA 210 | | 682 | 725 | 4 |
| 16 NK 13 | | 593 | 650 | 23 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 17 NK 13 A | | 588 | 645 | 26 |
| 18 NK 14 | | 603 | 665 | 14 |
| 19 NK 15 | | 597 | 642 | 51 |
| 20 NK 16 | | 608 | 660 | 30 |

TABLE 1-continued

Amidopyrylium compounds according to the invention
Spectral data in ethanol:
λ$_A$: absorption maximum
λ$_F$: fluorescence maximum
Q$_F$: fluorescence quantum yield

| | Structure | λ$_A$/nm | λ$_F$/nm | Q$_F$/% |
|---|---|---|---|---|
| 21 NK 19 | | 573 | 635 | 17 |
| 22 NK 20 | | 589 | 665 | 9 |
| 23 NK 21 | | 608 | 655 | 44 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 24 NK 22 | | 622 | 675 | 25 |
| 25 NK 10 | | 640 | 695 | 15 |
| 26 NK 26 | | 661 | 716 | 10 |

TABLE 1-continued

Amidopyrylium compounds according to the invention
Spectral data in ethanol:
λ_A: absorption maximum
λ_F: fluorescence maximum
Q_F: fluorescence quantum yield

| | Structure | $\lambda_A$/nm | $\lambda_F$/nm | $Q_F$/% |
|---|---|---|---|---|
| 27 NK 17 | | 617 | 672 | 20 |
| 28 NK 18 | | 631 | 686 | 15 |
| 29 NK 27 | | 623 | 678 | 25 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 30 NK 28 | | 635 | 690 | 30 |
| 31 NK 29 | | 622 | 677 | 21 |
| 32 NK 30 | | 718 | 770 | 2 |
| 33 NK 31 | | 622 | 675 | 35 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 34 NK 33 | | 611 | 666 | 25 |
| 35 NK 35 | | 631 | 686 | 13 |
| 36 NK 36 | | 635 | 690 | 15 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 37 NK 37 | | 677 | 733 | 14 |
| 38 NK 38 | | 673 | 725 | 11 |
| 39 NK 24 | | 629 | 684 | 30 |

TABLE 1-continued

Amidopyrylium compounds according to the invention
Spectral data in ethanol:
$\lambda_A$: absorption maximum
$\lambda_F$: fluorescence maximum
$Q_F$: fluorescence quantum yield

| | Structure | $\lambda_A$/nm | $\lambda_F$/nm | $Q_F$/% |
|---|---|---|---|---|
| 40 NK 25 | | 643 | 698 | 35 |
| 41 NK 39 | | 610 | 664 | 18 |
| 42 NK 40 | | 610 | 663 | 20 |
| 43 NK 41 | | 609.s | 663 | 18 |

The invention is illustrated in greater detail by the examples below. The FIGS. 1, 2 and 3 show the absorption and fluorescence spectra of the compounds according to the invention JA 227 (5), NK 13 (16) and Nk 14 (18).

EXAMPLES

Preparation of the amidopyrylium compounds

A. Dyes where $R_5$=H

The precursors are synthesized analogously to the synthesis procedure of Harnisch and Brack (Liebigs Ann. Chem. 740 (1970), 164–168). The dye syntheses are carried out at a reaction temperature which is lowered to 100° C. They are described by way of example by means of the structures 5 (JA 227) and 15 (JA 210). The preparation of the starting materials is contained in the following example or known from the literature.

Compound JA 210

1$^{st}$ Stage:

9-Ethyl-4-hydroxy-6,7,8,9-tetrahydro-1H-pyrido[2,3-g]quinol-2-one 3.5 g of 7-amino-1-ethyl-1,2,3,4-tetrahydroquinoline and 3.7 g of diethyl malonate are heated to 180–190° C. By means of a column (length: 10 cm; diameter: 0.5 cm), ethanol is distilled off until a solid has formed in the flask. The solid is stirred in 30 ml of acetone, filtered off with suction and the precipitate is washed with methanol. The precipitate is dried over phosphorus pentoxide.

Yield: 2.0 g. $^1$H-NMR data in CDCl$_3$: δ 1.1 (T, 3H, —CH$_3$); 1.8 (M, 2H, —CH$_2$—); 2.7 (T, 2H, Ar—CH$_2$—); 3.2–3.4 (M, 4H, 2×N—CH$_2$—); 5.4 (S, 1H, —=CH—); 6.4 (S, 1H, ArH); 7.3 (S, 1H, ArH); 10.5 (S, 1H, —NH); 10.6 (S, 1H, —OH);

2$^{nd}$ Stage:

9-Ethyl-4-methoxy-1-methyl-6,7,8,9-tetrahydro-1H-pyrido[2,3-g]quinol-2-one 2 g (8.2 mmol) of 9-ethyl-4-hydroxy-6,7,8,9-tetrahydro-1H-pyrido[2,3-g]quinol-2-one are suspended in 25 ml of dimethylformamide and treated with 6.7 g (0.12 mol) of potassium hydroxide. 8.6 g (0.07 mol) of dimethyl sulfate are added dropwise thereto at at most 60° C. (cooling with ice/sodium chloride bath). The suspension is discharged into 200 ml of water. A well filterable precipitate is formed, which is filtered off with suction and dried.

Yield: 1.8 g; M.p.: 208° C. with decomposition; $^1$H-NMR data in CDCl$_3$: δ 1.2 (T, 3H, —CH$_3$); 1.9 (M, 2H, —CH$_2$—); 2.8 (T, 2H, Ar—CH$_2$—); 3.2–3.4 (M, 4H, 2×N—CH$_2$—); 3.6 (S, 3H, —CH$_3$); 3.8 (S, 3H, —OCH$_3$); 5.8 (S, 1H, =CH—); 6.3 (S, 1H, ArH); 7.4 (S, 1H, ArH)

3$^{rd}$ Stage:

9-Ethyl-4-hydroxy-1-methyl-6,7,8,9-tetrahydro-pyrido[2,3-g]quinol-2-one 0.5 g (1.8 mmol) of 9-ethyl-4-methoxy-1-methyl-6,7,8,9-tetrahydropyrido[2,3-g]quinol-2-one in 5 ml of 10% strength hydrochloric acid is heated to reflux for 2 h. The suspension is neutralized to pH 5 using 10% strength sodium acetate solution. The precipitate is filtered off with suction and dried in a desiccator.

$^1$H-NMR data in d$_6$-DMSO: δ 1.1 (T, 3H, —CH$_3$); 1.9 (M, 2H, —CH$_2$—); 2.7 (T, 2H, Ar—CH$_2$—); 3.3–3.5 (M, 7H, NM—CH$_3$, 2×N—CH$_2$—); 5.5 (S, 1H, =CH—); 6.3 (S, 1H, ArH); 7.4 (S, 1H, ArH); 10.8 (S, 1H, —OH)

4$^{th}$ Stage:

4-Chloro-9-ethyl-1-methyl-6,7,8,9-tetrahydropyrido-[2,3-g]quinol-2-one-3-carbaldehyde 0.4 g of phosphorus oxychloride is added dropwise at 50–55° C. to 3 ml of dimethylformamide. The solution is stirred for a further 1 h at 50° C. 0.5 g (1.8 mmol) of 9-ethyl-4-methoxy-1-methyl-6,7,8,9-tetrahydropyrido-[2,3-g]quinol-2-one dissolved in 6 ml of dimethylformamide is then added at the same temperature with stirring. The mixture is stirred at 80–90° C. for a further 5 h. The intensively yellow-colored solution is discharged onto 50 ml of water and 10 g of ice and stirred at room temperature for 12 h. The pale-yellow precipitate is filtered off and dried. Absorption and fluorescence maximum in ethanol: $\lambda_A$=439 nm; $\lambda_F$=494 nm $^1$H-NMR data in CDCl$_3$: δ 1.3 (T, 3H, —CH$_3$); 2.0 (M, 2H, —CH$_2$—); 2.8 (T, 2H, Ar—H$_2$—); 3.5 (M, 4H, 2×N—CH$_2$—); 3.6 (S, 3H, N—CH$_3$); 6.1 (S, 1H, ArH); 7.7 (S, 1H, ArH); 10.4 (S, 1H, —CH=O).

5$^{th}$ Stage:

JA 210

0.18 g (0.69 mmol) of 9-ethyl-4-hydroxy-1-methyl-6,7,8, 9-tetrahydropyrido[2,3-g]quinol-2-one and 0.2 g (0.69 mmol) of 4-chloro-9-ethyl-1-methyl-6,7,8,9-tetrahydropyrido[2,3-g]quinol-2-one-3-carbaldehyde are dissolved in 20 ml of glacial acetic acid and heated for 20 min in a warm oil bath at 100° C. The solution is poured into 100 ml of water and the precipitate is filtered off. The dye is purified by chromatography.

$^1$H-NMR data in DMSO-d$_6$:

δ 1.3 (T, 6H, —CH$_3$); 1.9 (S, 4H, —CH$_2$—); 2.7 (S, 4H, Ar—CH$_2$—); 3.4 (S, 6H, N—CH$_3$); 3.6 (M, 8H, 2×N—CH$_2$—); 6.2 (S, 2H, ArH); 7.6 (S, 2H, ArH); 8.5 (S, 1H, —CH=)

Compound JA 227

1.2 g (4.5 mmol) of ethyl 4-(7-hydroxy-1,2,3,4-tetrahydroquinol-1-yl)butyrate and 1.2 g (4.5 mmol) of 4-chloro-7-dimethylamino-1-methylquinol-2-one-3-carbaldehyde are dissolved in 50 ml of glacial acetic acid and heated in a warm oil bath at 100° C. for 5 min.

The solution is added dropwise to 500 ml of 15% strength sodium chloride solution and the precipitate is filtered off. The dye is purified by chromatography.

B. Dyes where $R_5$=(substituted) phenyl ring

A preferred preparation of the compounds is presented by way of example by means of the structures 18 (NK 14), 20 (NK 16) and 23 (NK 21). The starting material syntheses, if these are not known from the literature, are carried out analogously to the examples described in part A. The synthesis of the benzoylbenzoic acid derivatives is carried out analogously to the preparation of 6-(2-carboxy-3,4,5,6-tetrachloro-benzoyl)-1-ethyl-7-hydroxy-2,2,4-trimethyl-1,2-dihydroquinoline, which is known from the literature.

Compound NK 14

1.2 g (3.9 mmol) of 2-(4-dimethylamino-2-hydroxy)-benzoylbenzoic acid and 1.0 g (3.9 mmol) of 9-ethyl-4-hydroxy-1-methyl-6,7,8,9-tetrahydropyrido[2,3-g]quinol-2-one are heated to reflux in 40 ml of 1,1,2,2-tetrachloroethane until the substances have dissolved completely. A total of 5 g of phosphorus pentoxide is then added in portions and the reaction mixture is refluxed for a further three hours. After cooling, the mixture is dissolved out of the flask using 50 ml each of water and chloroform and, after separating off the organic phase, the water phase is extracted a further three times with 50 ml each of chloroform. The combined organic phases are concentrated to dryness on a rotary evaporator and the dye is then purified by column chromatography.

The dye fractions are concentrated on a rotary evaporator, the residue is dissolved in 50 ml of ethanol and, after the addition of 10 ml of perchloric acid (60% strength), precipitated by dropwise addition of water. After filtering off with suction, the dye perchlorate is carefully washed with water and dried over phosphorus pentoxide in a desiccator.

Yield: 700 mg.

Compound NK 16

0.75 g (2.22 mmol) of 9-(2-carboxybenzoyl)-8-hydroxy-2,3,6,7-tetrahydro-1H,5H-benzo[ij]quinolizine and 0.57 (2.22 mmol) of 9-ethyl-4-hydroxy-1-methyl-6,7,8,9-tetrahydropyrido[2,3-g]quinol-2-one are heated to reflux in 40 ml of 1,1,2,2-tetrachloroethane until the substances have completely dissolved. A total of 5 g of phosphorus pentoxide is then added in portions and the reaction mixture is refluxed for a further three hours. After cooling, the mixture is dissolved out of the flask using 50 ml each of water and chloroform and, after separating off the organic phase, the water phase is extracted a further three times with 50 ml each of chloroform. The combined organic phases are concentrated to dryness on a rotary evaporator and the dye is then purified by column chromatography. The dye fractions are concentrated on a rotary evaporator, the residue is dissolved in 50 ml of ethanol and, after the addition of 10 ml of perchloric acid (60% strength), precipitated by dropwise addition of water. After filtering off with suction, the dye perchlorate is carefully washed with water and dried over phosphorus pentoxide in a desiccator.

Yield: 160 mg.

Compound NK 21

1.13 g (3.1 mmol) of 6-(2-carboxybenzoyl)-1-ethyl-7-hydroxy-2,2,4-trimethyl-1,2-dihydroquinoline and 0.68 g (3.1 mmol) of 7-dimethylamino-4-hydroxy-1-methylquinol-2-one are heated to reflux in 60 ml of 1,1,2,2-tetrachloroethane until the substances have completely dissolved. A total of 4 g of phosphorus pentoxide is then added in portions and the reaction mixture is refluxed for a further three hours. After cooling, the mixture is dissolved out of the flask using 50 ml each of water and chloroform and, after separating off the organic phase, the water phase is extracted a further three times with 50 ml each of chloroform. The combined organic phases are concentrated to dryness on a rotary evaporator and the dye is then purified by column chromatography.

The dye fractions are concentrated on a rotary evaporator, the residue is dissolved in 25 ml of ethanol and, after the addition of 8 ml of perchloric acid (60% strength), precipitated by dropwise addition of water. After filtering off with suction, the dye perchlorate is carefully washed with water and dried over phosphorus pentoxide in a desiccator.

Yield: 50 mg.

C. Examples of conjugate formation

NK 41 maleimide 100 mg of NK 41 (0.2 mmol) are dissolved in 10 ml of dried DMSO and treated with 100 mg (1 mmol) of maleic anhydride. The solution is stirred at room temperature for about 24 h. 50 ml of a 10% strength aqueous sodium perchlorate solution are added dropwise and the precipitated solid is filtered off. The solid is suspended in 5 ml of acetic anhydride with 25 mg of sodium acetate and heated to approximately 80° C. for 30 min. After cooling, 30 ml of the 10% strength sodium perchlorate solution are added dropwise, and the solid is filtered and dried.

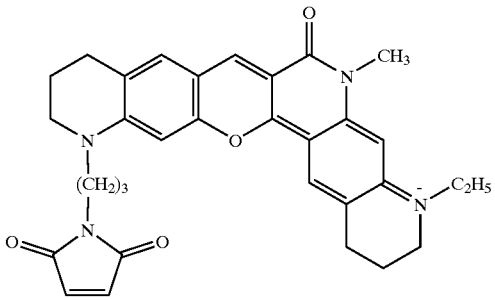

NK 41 maleimide-cysteine conjugate 70 mg (0.16 mmol) of NK 41 maleimide is dissolved in 20 ml of ethanol and treated in portions with 22 mg (0.16 mmol) of cysteine. The mixture is stirred at room temperature and, after 30 min, approximately 50 ml of a 10% strength sodium perchlorate solution are added dropwise. The precipitated solid is filtered off and dried.

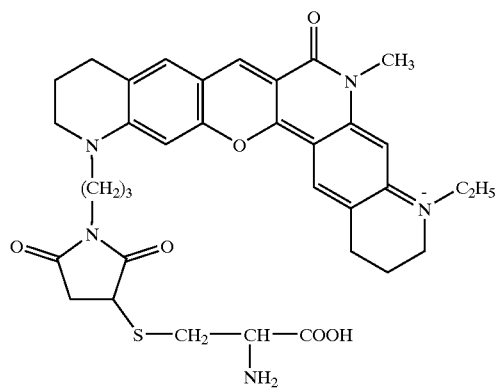

NK 27 active ester 50 mg (0.1 mmol) of NK 27 are dissolved in 20 ml of acetonitrile with 0.2 mmol of N-hydroxysuccinimide and 0.2 mmol of dicyclohexylcarbodiimide. The product mixture is stirred at room temperature for 5 h and concentrated on a rotary evaporator. Purification is carried out by chromatography.

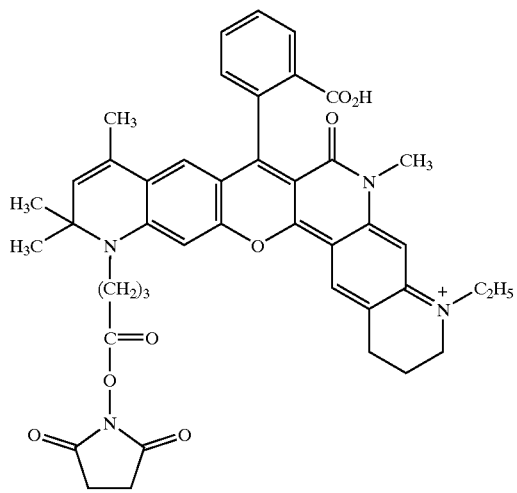

NK 27-dUTP conjugate 10 mol of 5-(3-aminoallyl)-dUTP are dissolved in 0.5 ml of 0.1 M sodium borate buffer (pH 8) and treated with a solution of 5 mol of NK 27 active ester in 1 ml of amine-free dimethylformamide. The solution is stirred at room temperature for 15 h. The solvent is distilled off in vacuo and the residue is purified by chromatography.

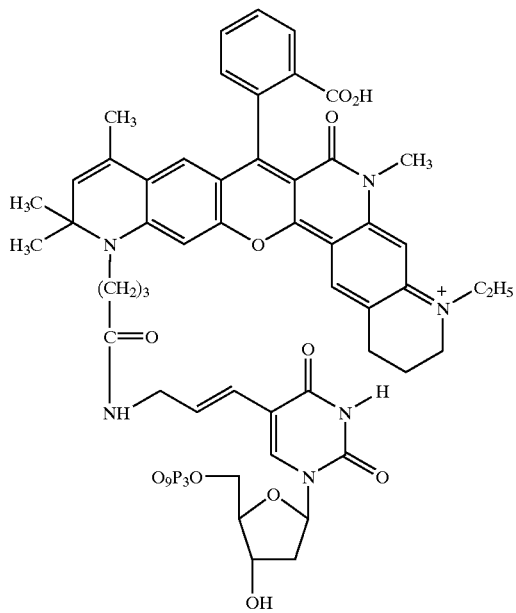

What is claimed is:

1. A method of detecting an analyte using labeling groups comprising the step of labeling the analyte with compounds of the general formula I

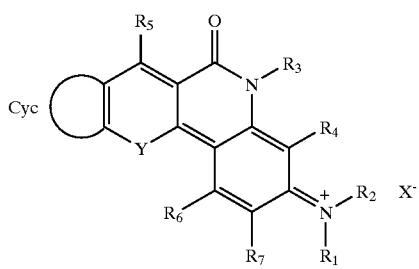

I as labeling groups and utilizing a procedure for the detection of an analyte; wherein Y is one of oxygen or N—$R_8$;

$R_1$, $R_2$, $R_3$ and $R_8$, each are independently a member of the group, selected from hydrogen, a phenyl group, a phenylalkyl group having 1—3 C atoms in the alkyl chain, a polyether group or a hydrocarbon group having up to 20 C atoms, and optionally containing one or more substituents, selected from at least one of halogens, amino, sulfo, carboxyl, aldehyde, alkoxy and alkoxycarbonyl groups, or one or more of the radicals $R_1$, $R_2$, $R_3$ and $R_8$ form a ring system with a suitable adjacent substituent;

$R_4$, $R_5$, $R_6$ and $R_7$ are each independently, a member selected from the group of hydrogen, halogen, phenyl, a hydroxyl, amino, sulfo, a carboxyl group or a hydrocarbon derivative having up to 15 C atoms; wherein the hydrocarbon derivatives comprise at least one of an alkyl, alkenyl, alkynyl, cycloalkyl, aryl and heteroaryl radicals and optionally each, member contains at least one or more substituents, selected the group of halogens, amino, sulfo, carboxyl, aldehyde, alkoxy and alkoxycarbonyl groups, wherein one or more of the radicals $R_4$, $R_6$ and $R_7$ can form a ring system with an adjacent substituent; and wherein Cyc is an organic radical which comprises a ring system selected from at least one of aromatic, heteroaromatic, quinoid and cycloaliphatic rings, which can optionally contain one or more substituents selected from at least one of halogens, amino, hydroxyl, sulfo, carbonyl, aldehyde, alkoxy and alkoxycarbonyl groups, and X represents optionally anion species present for charge equalization.

2. The method as claimed in claim 1, wherein the compound I is coupled covalently to a receptor specific for the analyte to be detected.

3. The method as claimed in claim 1, wherein the detection procedure is selected from the group consisting of nucleic acid hybridization procedures and immunochemical procedures.

4. A compound of the general formula I

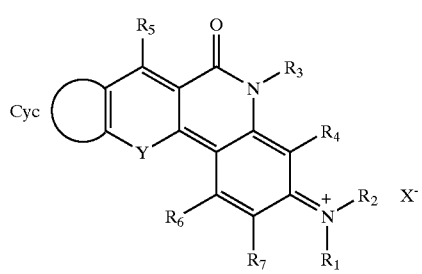

I wherein

Y, $R_1$–$R_7$ and Cyc are defined as in claim 1,

X represents optionally anion species present for charge equalization, with the proviso that if Y is oxygen, $R_1$, $R_2$ and $R_3$ are methyl and $R_4$, $R_5$, $R_6$ and $R_7$ are hydrogen, and Cyc does not have a structure of the formulae II, III, IIIa or IIIb.

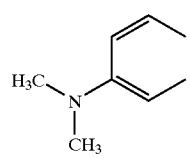

II

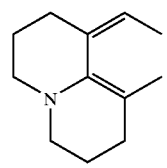

III

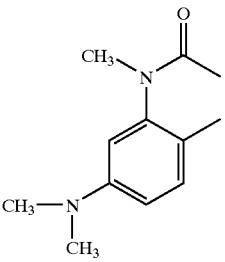

IIIa

-continued

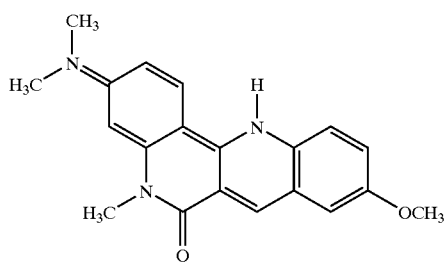
IIIb

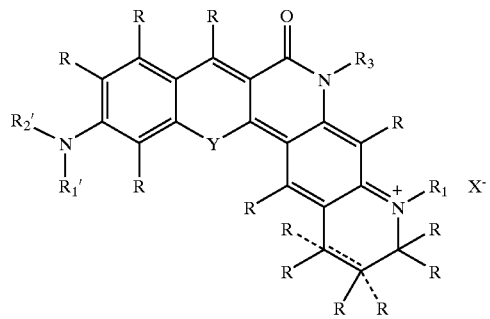
VIIa

5. The compound as claimed in claim 4, wherein at least one of $R_1$ is bridged with $R_7$ and $R_2$ is bridged with $R_4$ and form a ring system.

6. The compound of the formula I as claimed in claim 4, in which Cyc has a structure of the formulae IV, V or VI

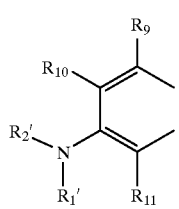
IV

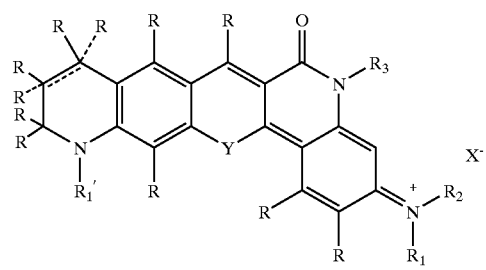
VIIb

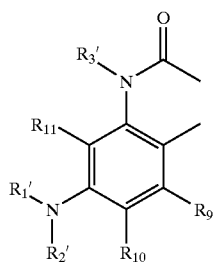
V

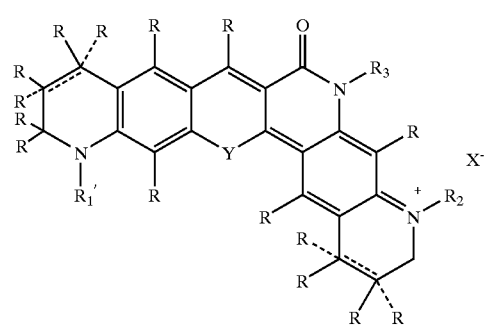
VIIc

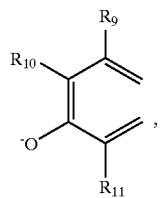
VI

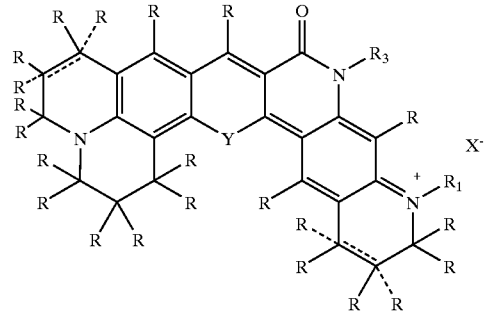
VIId where $R_1'$, $R_2'$ and $R_3'$ are as defined in claim 1, and $R_9$–$R_{11}$ are defined as $R_4$–$R_7$ in claim 1.

7. The compound as claimed in claim 6, wherein at least one of $R_1'$ is bridged with $R_{11}$ and $R_2'$ is bridged with $R_{10}$ and form a ring system.

8. The compound as claimed in claim 4, which corresponds to one of the general formulae VII a to f

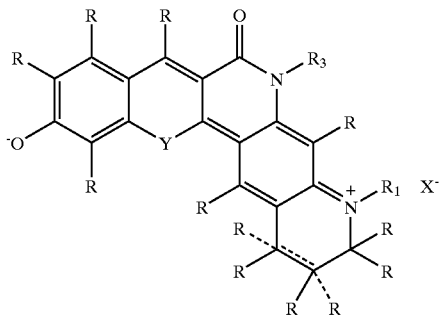
VIIe

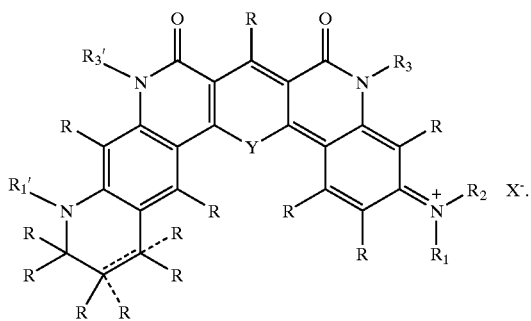

VIIf where
the broken lines are optionally double bonds, and in the presence of the double bonds the radicals R bonded via a broken line are absent,
X, Y, $R_1$, $R_2$ and $R_3$ are as defined in claim 4 and 5,
$R_1'$, $R_2'$ and $R_3'$ are as defined in claim 6 and 7, and
R in each case independently of one another is defined as $R_4$ in claim 4.

9. The compound as claimed in claim 4, wherein Y is oxygen.

10. The compound as claimed in claim 4, wherein $R_5$ comprises an aromatic, optionally substituted ring system.

11. The compound as claimed in claim 4, further comprising a group capable of covalent coupling.

12. The compound as claimed in claim 11, wherein the coupling group includes at least one selected from the group of —COOH, —$NH_2$, —OH and —SH.

13. The compound as claimed in claim 11, wherein it is coupled to at least one of a carrier and a biomolecule via coupling groups.

14. The compound as claimed in claim 13, wherein the carrier is selected from at least one of porous glass, ion-exchange resins, plastics, dextrans, cellulose, cellulose derivatives and hydrophilic polymers.

15. The compound as claimed in claim 13, wherein the biomolecule is selected from at least from one of peptides, polypeptides, nucleotides, nucleosides, nucleic acids, nucleic acid analogs and haptens.

16. A labeling agent for the detection of an analyte, which comprises the compounds according to claim 4.

17. The method of claim 1, wherein the polyether group or the hydrocarbon group has up to 6 C atoms.

18. The compound as claimed in claim 7, wherein the ring system is 5 membered or a 6 membered ring.

* * * * *